Figure 1:
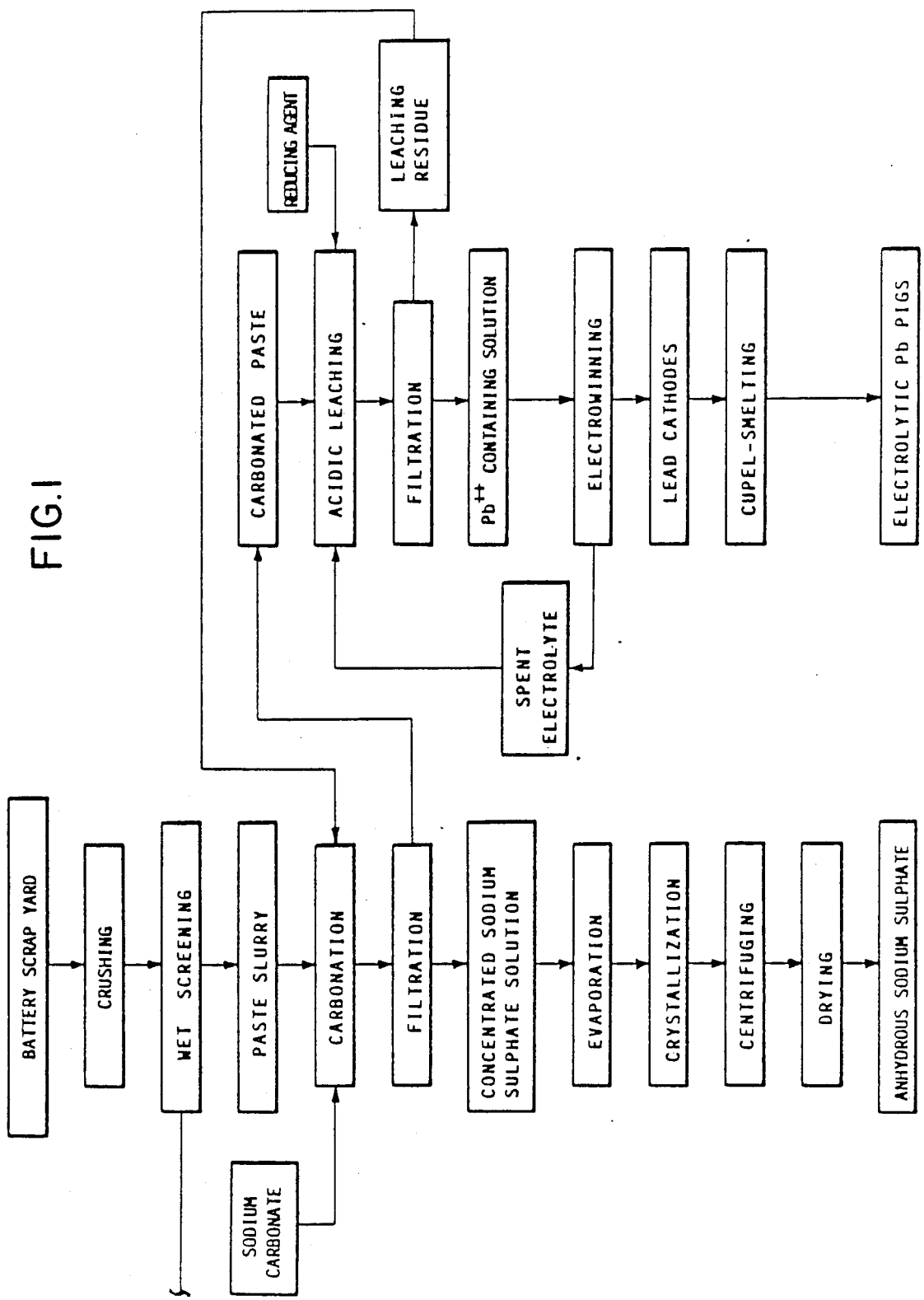
Figure 1A:
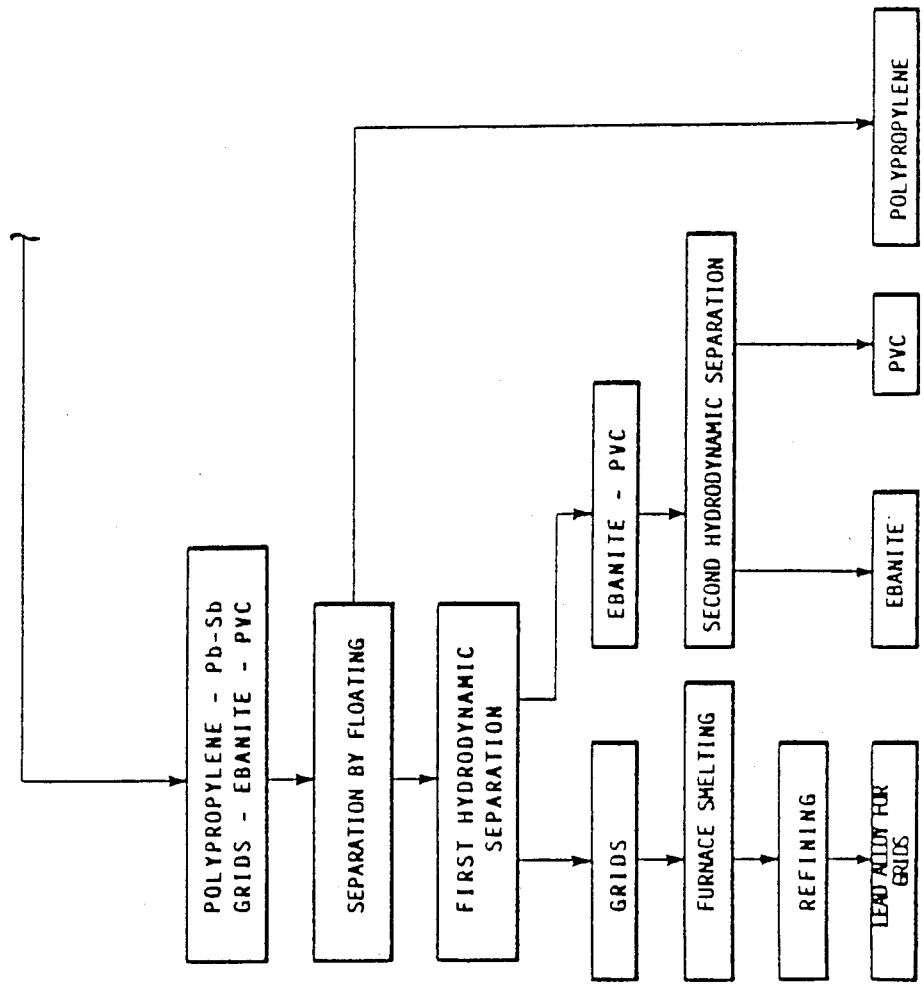

United States Patent [19]

Olper et al.

[11] Patent Number: 4,769,116
[45] Date of Patent: Sep. 6, 1988

[54] HYDROMETALLURGICAL PROCESS FOR AN OVERALL RECOVERY OF THE COMPONENTS OF EXHAUSTED LEAD-ACID BATTERIES

[75] Inventors: Marco Olper, Monza; Pierluigi Fracchia, Milan, both of Italy

[73] Assignee: Engitec Impianti S.p.A., Milan, Italy

[21] Appl. No.: 1,442

[22] Filed: Jan. 8, 1987

[30] Foreign Application Priority Data

Jan. 9, 1986 [IT] Italy ............................ 19031 A/86

[51] Int. Cl.$^4$ .......................................... C22B 13/00
[52] U.S. Cl. .................................... 204/114; 204/115; 429/49; 75/78; 75/120; 423/98; 423/209; 423/551
[58] Field of Search ............... 429/49; 423/92, 98, 423/434, 209, 551; 75/115, 78, 120; 204/114, 115

[56] References Cited

U.S. PATENT DOCUMENTS

| | | | |
|---|---|---|---|
| 2,013,813 | 5/1932 | Thomsen | 423/98 |
| 2,328,089 | 8/1943 | Mulligan | 75/120 |
| 3,892,563 | 7/1975 | LaPoint | 423/98 |
| 4,460,442 | 7/1984 | Ducati | 204/114 |
| 4,637,928 | 1/1987 | Zajac, Jr. et al. | 429/49 |

FOREIGN PATENT DOCUMENTS 1066619 4/1967 United Kingdom ............... 429/49

Primary Examiner—Robert L. Stoll
Attorney, Agent, or Firm—Foley & Lardner, Schwartz, Jeffery, Schwaab, Mack, Blumenthal & Evans

[57] ABSTRACT

The invention relates to a hydrometallurgical process for the overall recovery of the components of exhausted lead-acid batteries, in a re-useable form, said components being mainly constituted by such materials as polypropylene, ebanite, PVC; by paste comprising lead sulphatized compounds; and by pure or alloyed metal lead, characterized in that it comprises the following steps:

(a) battery crushing,
(b) separation of paste by wet-screening,
(c) separation of polypropylene by water floating,
(d) separation of ebanite and PVC from pure or alloyed metal lead, by means of a first hydrodynamic separation,
(e) separation of ebanite from PVC by a second hydrodynamic separation,
(f) desulfurization of paste by carbonation by sodium carbonate, with pure sodium sulphate being obtained,
(g) recovery of so-obtained pure sodium sulphate,
(h) treatment of carbonated paste in order to recovery from it the lead, in pure metal form, by extraction by electrowinning.

8 Claims, 1 Drawing Sheet

HYDROMETALLURGICAL PROCESS FOR AN OVERALL RECOVERY OF THE COMPONENTS OF EXHAUSTED LEAD-ACID BATTERIES

The present invention relates to a process for the recovery of the components of exhausted lead-acid batteries.

According to the purposes of the invention, such a process wants to be of completely hydrometallurgical type, as an alternative to, e.g., the pyrometallurgical processes, which involve problems, above all of environmental and pollution type.

The process of the invention intends furthermore to offer an intergal recovery of all of the components of exhausted batteries, in an industrially re-useable form.

In particular, by such a process, the recovery is pursued, in a pure enough state, of the following components, in particular for the uses as specified hereunder: polypropylene scrap, for the production of granulate; lead scrap, for the production of titrated alloys; ebanite scrap, as auxiliary, chlorides-free fuel; the lead contained in the active mass, viz., paste, in a pure metal form, which does not require any further purification treatments for being re-used; and, furthermore, a industrially advantageous recovery of the desulphurization reactant used to desulphurize the paste.

All of these purposes, and other advantages as they shall be mentioned hereunder, are jointly achieved by the present invention by means of a hydrometallurgical process for an overall recovery of the components of exhausted lead-acid batteries, in a re-useable form, said components being mainly constituted by such materials as polypropylene, ebanite, PVC; by paste comprising lead sulphatized compounds; and by pure or alloyed metal lead, characterized in that it comprises the following steps:

(a) battery crushing,
(b) separation of paste by wet-screening,
(c) separation of polypropylene by water floating,
(d) separation of ebanite and PVC from pure or alloyed metal lead, by means of a first hydrodynamic separation,
(e) separation of ebanite from PVC by a second hydrodynamic separation,
(f) desulphurization of paste by carbonation by sodium carbonate, with pure sodium sulphate being obtained,
(g) recovery of so-obtained pure sodium sulphate,
(h) treatment of carbonated paste in order to recover from it the lead, in pure metal form, by extraction by electrowinning.

According to the invention, the treatment according to said step (h) is advantageously the same as disclosed in the U.S. patent application Ser. No. 923,262 to the same Applicant, now abandoned.

To the purpose of better understanding characteristics and advantages of the invention, hereunder a non-limitative example of practical embodiment thereof is disclosed, by referring to the figure of attached drawing, which shows a schematic flowsheet of the process, represented by a block diagram.

Referring to such a figure, the exhausted batteries coming from a scrap yard enter a hammer mill for being crushed into small pieces.

The crushed scrap, dispersed in a carefully metered water stream, is conveyed to a fine-mesh rotary screen, partly immersed in water. The revolutions per minute and the length of screen drum are computed in such a way that the metal and non-metal pieces having a size larger than screen apertures, e.g., 1.5 mm, are only discharged when their surfaces are well cleaned; and that all the paste, by disengaging from the grids, collects in the bottom of the container tank, as a thick slurry.

The mixed scraps, both of metal and non-metal character, constituted by polypropylene, grids, and other parts of either pure or alloyed Pb, ebanite, PVC, etc., are conveyed, by a system of Archimedean screws, along a channel, wherein polypropylene scrap is separated by water floating.

The remaining scraps are continuously fed to a first hydrodynamic separator.

The lead scrap (grids, connections, poles) falls down to separator base, and, because of its high metal content (94–95%), it can be directly smelted, at low temperature, in a furnace, an antimonial lead alloy being obtained.

The ebanite and PVC scraps, pushed upwards by the strong rising water stream, are free from metal portions, and can be subsequently separated from each other by treatment in a second hydrodynamic separator.

Conveyor water is recycled.

The thick slurry, with the paste being in a finely subdivided state, is transferred to a stirred vat, for the step of paste desulphurizing by carbonation. By the addition of sodium carbonate, lead sulphate, the main component of paste, is converted into lead carbonate, and at the same time, a concentrated solution of sodium sulphate is produced. In the carbonation reaction of the invention, the temperature must be comprised within the range of from 30° to 40° C., in order to remain within the range of highest sodium sulphate solubility, and to favour the flocculation and separation of the various lead compounds; the concentration of solution must be as high as possible (solid/liquid ratio higher than, or equal to, 1:1), so to render financially feasible the evaporation of sodium sulphate solution; the amount of sodium carbonate to be added should be about stoichiometric, in order that the sodium sulphate crystals do not contain an excessive alkalinity.

The reacted mixture is filtered, while still hot, by filter-press, to separate the carbonated paste from the concentrated solution of sodium carbonate.

This latter is passed over a finishing filter, after the preliminiary addition of activated charcoal, to obtain a clear, colourless solution and is delivered to the evaporator. The crystals of anhydrous sulphate are centrifuged, dried in a hot air stream and stored as they are formed.

The carbonated paste, constituted by a mixture of lead-containing compounds (lead carbonate, basic carbonate, dioxide, oxide, besides a small percentage of metal Pb) is supplied, after a careful water-washing so that sodium sulphate is completely removed, to a vat, for leaching with a solution of fluoboric acid. Under steady state conditions, the leaching is carried out with the spent electrolyte, which comes from lead electrowinning.

Lead carbonates and lead oxides are immediately deposited; lead dioxide must be preliminarily transformed into the oxide, by means of a suitable reducing agent.

According to the invention, hydrogen peroxide is the most suitable reducing agent to cause the reaction to occur:

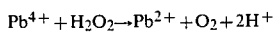

The considerable amount of $O_2$ which evolves during Pb dioxide reduction reaction activates physically the surface of the particles of metal Pb, always present in the paste, so that the reaction $$Pb + Pb^{4+} \rightarrow 2Pb^{2+}$$

can occur more easily.

Hence, metal Pb contained in the paste is dissolved, cooperating to the reduction of lead dioxide.

Another important task performed by the metal Pb during the acidic bleaching is that of "cementing" the impurities, such as Sb, Ag and Bi, which may have been dissolved.

The solution is thus self-purified, and can be sent, after the filtration, directly to the electrolytic Pb extraction.

The electrolysis is performed inside normal cells, with insoluble anodes of graphite or other suitable materials, and with cathodes of sheet-lead.

By operating under proper conditions, a cathodic deposit of excellent quality and purity can be obtained, with the anodic production of $PbO_2$ being kept as low as possible.

The cathodes are re-smelted into pigs, and are marketed as electrolytic lead.

The spent electrolyte returns back to the acidic paste leaching.

As can be understood from the above reported example, the process of the invention allows all of the valuable components obtained from exhausted lead acidic batteries to be recovered at such purity that they can be industrially re-used: polypropylene scrap for granulate production, lead scrap for the production of titrated alloys by low-temperature smelting, ebanite scrap as auxiliary, chlorides-free fuel.

The anhydrous sodium sulphate obtained in (f) and (g) steps is of sufficient purity (99.9%), to be used, e.g., in detergents manufacturing.

As to such a sodium sulphate recovery, it should be observed that in the reaction of paste desulphurization, the reaction speed is high (the double-exchange reaction is complete within about 1 hour); the paste desulphurization yields are high (92%); the conditions under which the reaction must take place are critical, for the good success and the same financial feasibility of the process.

In fact, the desulphurization involves a considerable expense for sodium carbonate, and only the low-cost production of sodium sulphate in pure state, and hence industrially valuable, can allow the cost of the reactant to be compensated for, and hence the financial balance of the process to be re-equilibrated.

Data obtained from the plant indicates that the solution exiting the step of leaching with sodium carbonate contains:
$Na_2SO_4$ 322 g/l
$Na_2CO_3$ 0.28 g/l The crystals of sodium sulphate, produced by starting from that solution, by crystallization and subsequent hot-air drying, contain:
$Na_2SO_4$ 99.92%
$Na_2CO_3$ 0.06%
and are hence in compliance with the requirements of the commercial product.

We claim:

1. Hydrometallurgical process which, for an overall recovery of the components of exhausted lead-acid batteries, in a re-usable form, said components being mainly constituted by such materials as polypropylene, ebanite, PVC; by paste comprising lead sulphatized compounds; and by pure or alloyed metal lead, characterized in that it comprises the following steps:
   (a) battery crushing,
   (b) separation of paste by wet-screening,
   (c) separation of polypropylene by water floating,
   (d) separation of ebanite and PVC from pure or alloyed metal lead, by means of a first hydrodynamic separation,
   (e) separation of ebanite from PVC by a second hydrodynamic separation,
   (f) desulphurization of paste by reaction of lead sulphate in the paste with a stoichiometric amount of sodium carbonate at temperatures ranging from about 30° to 40° C. in a solution in which the solid/liquid ratio is greater than or equal to 1:1, with pure sodium sulphate being obtained,
   (g) recovery of so-obtained pure sodium sulphate,
   (h) treatment of carbonated paste in order to recover from it the lead, in pure metal form, by extraction by electrowinning.

2. Process according to claim 1, characterized in that said step (b) is carried out by means of a fine-mesh rotary screen, with diameter of apertures of about 1.5 mm.

3. Process according to claim 1, characterized in that the pure or alloyed metal lead separated in said step (d) is directly re-smelted to obtain pure lead or a lead alloy suitable to be re-used for battery grids.

4. Process according to claim 1, wherein said step (f) of paste desulphurization additionally comprises separation of so-formed lead carbonate from the high-temperature solution of sodium sulphate by filtration; and wherein said step (g) of sodium sulphate recovery from said solution is carried out by crystallization.

5. Process according to claim 1, characterized in that said step (h) is carried out by means of the steps of:
   (i) leaching said carbonated paste with an aqueous solution of an acid selected from the group consisting of fluoboric and fluosilicic acids,
   (l) addition of hydrogen peroxide during the paste leaching according to (i), in order that the following reactions may occur contemporaneously:

$$Pb^{4+} + H_2O_2 \rightarrow Pb^{2+} + O_2 + 2H^+ \quad (1)$$

$$Pb + Pb^{4+} \rightarrow 2Pb^{2+} \quad (2)$$

up to the quantitative reduction of all of lead dioxide contained in said paste,
   (m) separation of the solid residue from the so-obtained dissolved-lead-containing solution.

6. Process according to claim 5, characterized in that said reaction (2) according to (l) is activated by the oxygen evolving in said reaction (1) according to (l).

7. Process according to claim 6, wherein the components of said exhausted lead battery additionally comprise Sb, Ag and Bi as impurities and cementation of said impurities is performed by said metal Pb physically activated by the $O_2$ which evolves form said reaction (1).

8. Process according to claim 5, characterized in that is additionally comprises the following steps:
   (o) treating said dissolved-lead-containing solution according to (m), by extraction by electrowinning, with cathodes of metal lead being formed.
   (p) recycling the exhausted electrolyte obtained in said step (o) to said leaching step (i).

* * * * *